(12) United States Patent
Zhu et al.

(10) Patent No.: US 9,792,790 B1
(45) Date of Patent: Oct. 17, 2017

(54) COLLECTIVE OBJECTS MANAGEMENT SYSTEM WITH ENHANCED SECURITY

(71) Applicants: Shengbo Zhu, San Jose, CA (US); Su Shiong Huang, Bellevue, WA (US)

(72) Inventors: Shengbo Zhu, San Jose, CA (US); Su Shiong Huang, Bellevue, WA (US)

(73) Assignee: MICRODATA CORPORATION, San Jose, CA (US)

( * ) Notice: Subject to any disclaimer, the term of this patent is extended or adjusted under 35 U.S.C. 154(b) by 0 days.

(21) Appl. No.: 14/999,871

(22) Filed: Jul. 12, 2016

(51) Int. Cl.
*G08B 13/14* (2006.01)
*H04L 29/06* (2006.01)

(52) U.S. Cl.
CPC ............. *G08B 13/14* (2013.01); *H04L 63/10* (2013.01)

(58) Field of Classification Search
CPC ................................. G08B 13/14; H04L 63/10
USPC .............................. 340/10.1–10.6, 571–572.6
See application file for complete search history.

(56) References Cited

U.S. PATENT DOCUMENTS

2002/0158761 A1* 10/2002 Runyon ................. G07C 5/008
340/539.1

* cited by examiner

*Primary Examiner* — Kerri McNally
*Assistant Examiner* — Sharmin Akhter

(57) ABSTRACT

A collective objects management system with enhanced security for objects contained in object receptacles distributed throughout the system. Each object receptacle has a microcontroller with a unique system address which enables generation of a response signal whenever an incoming address from a source is a match. An object container microcontroller periodically polls the object receptacle microcontrollers in the cabinet and stores an updated version of the cabinet object data base. When an object is detected as missing, the object container microcontroller checks whether the absence of the object was authorized by a host computer. If not, a local alarm is activated and the host computer is informed. The host computer can take additional security measures.

3 Claims, 2 Drawing Sheets

COLLECTIVE OBJECTS MANAGEMENT SYSTEM WITH ENHANCED SECURITY

BACKGROUND OF THE INVENTION

This invention relates to collective objects management systems in general, and in particular to an improved collective objects management system using object identification with digital addresses. More particularly, this invention relates to an improvement for a collective objects management system using object identification with digital addresses, the improvement pertaining to enhanced security for the collection of objects in the system.

The term "collective objects management systems" is a term coined to denote systems for generally keeping track of items ("objects") in a collection of items. For example, in business offices and some homes, file storage cabinets are typically used to store documents used for both business and personal activities. A typical file storage cabinet has several pull-out drawers each containing a relatively large number of file folders ("objects"), with each folder containing one or more documents. In order to enable the documents contained in the various files to be readily accessed and inventoried, some type of file management system is necessary.

Commonly assigned U.S. Pat. No. 8,471,717 issued Jun. 25, 2013 for "Collective Objects Management System With Object Identification Using Addressable Decoder Units" discloses a system for managing objects distributed in an object location space. The disclosure of the '717 patent is hereby incorporated by reference. The '717 system comprises a container, such as a file drawer, having a plurality of mutually electrically isolated electrically conductive paths, at least one of which can receive address signals supplied by a source and specifying a sought object; a plurality of object receptacles positioned in the container, each of the plurality of object receptacles having (a) a plurality of electrically conductive members, each of which is electrically coupled to a different one of the plurality of mutually electrically isolated electrically conductive paths;

(b) an address decoder circuit associated to an object in the receptacle, the address decoder circuit having a unique system address, the address decoder circuit further having a plurality of electrically conductive terminals in electrical contact with the plurality of electrically conductive members; and (c) an indicator, such as a visible indicator (e.g., an LED) coupled to the address decoder circuit for activation whenever the address decoder circuit detects an address signal present on at least one of the plurality of electrically conductive members and representative of the unique system address.

The '717 system further includes a source comprising an encoder for generating the address signals, the encoder having at least one input terminal for receiving object identification signals from a supply device, at least one output terminal coupled to each address decoder circuit of the plurality of object receptacles, and circuitry for generating a signal representative of the unique system address of the object specified by the object identification signals.

In a specific embodiment, the container comprises a file folder drawer; and each object receptacle comprises a file folder having a pair of support braces, with one of the support braces containing the plurality of electrically conductive members. In this embodiment, the address decoder circuit and the indicator of each of the object receptacles are carried by one of the two support braces of each file folder.

Preferably, each file folder has an upper margin, and each indicator is mounted to the corresponding file folder in a position extending above the upper margin so as to be noticeable when the file folder drawer is in an opened position.

The file folder drawer includes at least two electrically non-conductive support members on which different ones of the plurality of mutually electrically isolated electrically conductive paths are located. One of the support braces of each of the plurality of object receptacles comprises an elongate body structure formed from an electrically non-conductive material with a pair of opposite ends, each end having a downwardly opening cut-out channel provided with a pair of spring contacts secured to the elongate body structure, with each spring contact being electrically coupled to a different one of the plurality of electrically conductive members. Each end of the one of the support braces of the plurality of object receptacles is supported by a different one of the at least two electrically non-conductive support members when received in the file folder drawer.

The file folder drawer has a front panel with an additional indicator mounted thereon; and the system further includes circuitry for operating the additional indicator whenever an address decoder circuit located in the file folder drawer detects an address signal present on the at least one of the plurality of electrically conductive members and representative of the unique system address of that address decoder.

Each address decoder circuit includes circuitry for generating a VALID signal whenever that address decoder circuit detects an address signal present on the at least one of the plurality of electrically conductive members and representative of the unique system address of that address decoder circuit.

A cabinet microcontroller supplies power signals to the plurality of object receptacles via some of the electrically conductive paths, and address signals via the at least one of the electrically conductive paths; and receives VALID signals generated by each address decoder circuit when an incoming address matches a given address decoder circuit system address. The microcontroller also includes circuitry for generating information signals identifying the location in the system of any address decoder circuit which generates a VALID signal.

The '717 technique provides objects management capability for objects distributed in an object location space which is superior to older, manual techniques implemented in the past. For example, to conduct a survey of all objects currently located somewhere in the system a host computer sends a polling inquiry to each cabinet microcontroller in the system. In the '717 system, the polling inquiry identifies a specific object receptacle by a system address and each cabinet microcontroller converts this system address to a local object receptacle address using the cabinet encoder, which presents this local object address to all object receptacles in that cabinet. If an address match occurs, a VALID signal is received by the cabinet microcontroller which composes and sends a message to the host computer confirming that the specified object receptacle has been located and specifying the cabinet and drawer location. The host computer next issues another polling inquiry identifying a different specific object receptacle, each cabinet microcontroller converts this system address to a local object receptacle address using the cabinet encoder, which presents this local object address to all object receptacles in that cabinet. If an address match occurs, a VALID signal is received by the cabinet microcontroller which composes and sends a message to the host computer confirming that the specified object receptacle has been located and specifying the cabinet and drawer location. This polling process continues until all system addresses have been processed. In the absence of any response to a given system address, the host computer will update its data base to note that an object receptacle is missing from the system. This polling technique greatly simplifies object data base management, particularly with data bases having relatively large numbers of different objects located in spatially distributed containers.

U.S. Pat. No. 8,717,143 issued May 6, 2014 for "Searchable Binder", the disclosure of which is hereby incorporated by reference, discloses a collective objects management system which utilizes the same principles as the '717 system applied to a collection of document binders removably stored on cabinet shelves. Each document binder has a binder MCU which contains the unique identification for that binder in the system and which responds to sought binder address information signals supplied by a host computer via a cabinet MCU by generating a binder found signal whenever an incoming binder address information signal matches the unique identification stored in the binder MCU. The binder found signal is supplied to the cabinet MCU, which relays this information to the host computer. In addition, the cabinet MCU activates an optional audible indicator to assist the operator in locating the cabinet containing the sought binder. When a binder is removed from a shelf, the cabinet MCU detects this event and relays this change of state of the system to the host computer, which in turn updates its inventory data base.

Commonly assigned, co-pending U.S. patent application Ser. No. 14/999,010 filed Mar. 17, 2016 for "Removably Suspended Electronically Addressable Object And System", the disclosure of which is hereby incorporated by reference, discloses a collective objects management system which utilizes the same principles as the '717 and '143 systems applied to a collection of objects designed to be removably suspended for storage, access and display purposes. An example of this class of collective objects is a collection of keys each provided with a key holder which can be removably attached to a suspension device, such as a hook or a peg. Several key holders and keys are usually removably stored in one or more key cabinets, depending on the number of keys in the collection. Another example of this class of collective objects is a collection of mechantable items (such as dry cell batteries, hardware items, or the like) carried by a packaging unit designed to be removably attached to a suspension device and provided with identifying information for the item. The key holders and packaging units are object carriers, each of which includes a housing having an object retention element for securing an object to the object carrier and at least one through aperture for removably receiving an electrically conductive suspension member capable of manifesting object address signals and power signals supplied by a source. A microcontroller carried by the housing contains a unique object address serving to identify an object secured to the object carrier. An electrically conductive element located in the at least one aperture electrically couples the microcontroller to the electrically conductive suspension member when the aperture is removably received on the electrically conductive suspension member; and a visible indicator coupled to the microcontroller is activated whenever the microcontroller receives an address signal representative of the unique object address. Two electrically conductive elements can be used: one having first and second electrically conductive members slidably and oppositely disposed in a single aperture and bias means for urging the first and second electrically conductive members toward each other to make contact with an electrically conductive suspension member when the carrier is mounted; another being a pair of washers mounted in spaced first and second apertures in the housing. In use, the devices are removably suspended by one or two electrically conductive suspension members secured to a support element, such as the back board of a cabinet.

In all of the above described collective objects management systems, operation normally proceeds by entering the identity of an object being sought into a host computer using a keyboard entry device. The host computer then issues the system object address signals which are coupled to each of the cabinet MCUs. Each cabinet MCU couples these system object address signals to the individual object receptacles (file folders, binders, or object carriers, depending on the system configuration). When a match occurs, the cabinet MCU activates a cabinet visible indicator and signals to the host computer that the sought object has been found. At this point in the operating process the operator is free to remove the sought object receptacle from its location. The operator, however, is also free to remove other object receptacles which are accessible, such as other file folders, binders or object carriers. This unauthorized removal will normally go undetected until a full scan of the system inventory is conducted by the host computer, which typically only occurs much later in time. Also, anyone with access to the storage facility where the objects are located is capable of removing object receptacles from cabinets which are not furnished with locking doors and from conventional binder shelves. Such unauthorized removal of object receptacles may also go undetected until a full scan of the system inventory is conducted by the host computer. This lack of security is undesirable.

SUMMARY OF THE INVENTION

The invention comprises a collective objects management system with enhanced security which affords instant notification that an unauthorized removal of an object receptacle has occurred.

From an apparatus standpoint, the invention comprises a cabinet microcontroller unit having at least one input/output terminal for communication with a host computer, a memory unit coupled to the cabinet microcontroller, a plurality of object receptacles each coupled to the cabinet microcontroller and each having an object receptacle microcontroller for storing unique identification information for an associated object, and an audible indicator coupled to the cabinet microcontroller, the cabinet microcontroller being configured to perform a polling operation on all object receptacles coupled thereto, to compare the unique identification information received from the object receptacles during a current polling operation with information stored in the memory during a previous polling operation, to detect a missing object receptacle, and to activate the audible indicator with a first distinct audible signal when a missing object receptacle is unauthorized. The cabinet microcontroller is further configured to detect a new object receptacle and to activate the audible indicator with a second distinct audible signal to signify that the new object receptacle is operationally installed.

From a system standpoint, the invention comprises a collective objects management system having a host computer and a plurality of cabinet microcontroller units each having at least one input/output terminal for communication with the host computer, a memory unit coupled to the cabinet microcontroller, a plurality of object receptacles each coupled to the cabinet microcontroller and each having an object receptacle microcontroller for storing unique identification information for an associated object, and an audible indicator coupled to the cabinet microcontroller, the cabinet microcontroller being configured to perform a polling operation on all object receptacles coupled thereto, to compare the unique identification information received from the object receptacles during a current polling operation with information stored in the memory during a previous polling operation, to detect a missing object receptacle, and to activate the audible indicator with a first distinct audible signal when a missing object receptacle is unauthorized. The cabinet microcontroller is also configured to notify the host computer when a missing object receptacle is unauthorized so that the host computer can take further remote action to prevent unauthorized re-location of the missing object receptacle. The cabinet microcontroller is further configured to detect a new object receptacle and to activate the audible indicator with a second distinct audible signal to signify that the new object receptacle is operationally installed.

By providing the local security feature of an audible alarm unit in each cabinet activatable by the local cabinet MCU when the removal of an object is unauthorized, authorized personnel in the range of the audible alarm unit are enabled to take immediate action to investigate and intervene, if necessary, to prevent the possible theft or unauthorized re-location of an object registered in the system. Also, by providing the remote security feature of the invention, additional steps can be taken to prevent or deter a theft or unauthorized re-location of an object registered in the system.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
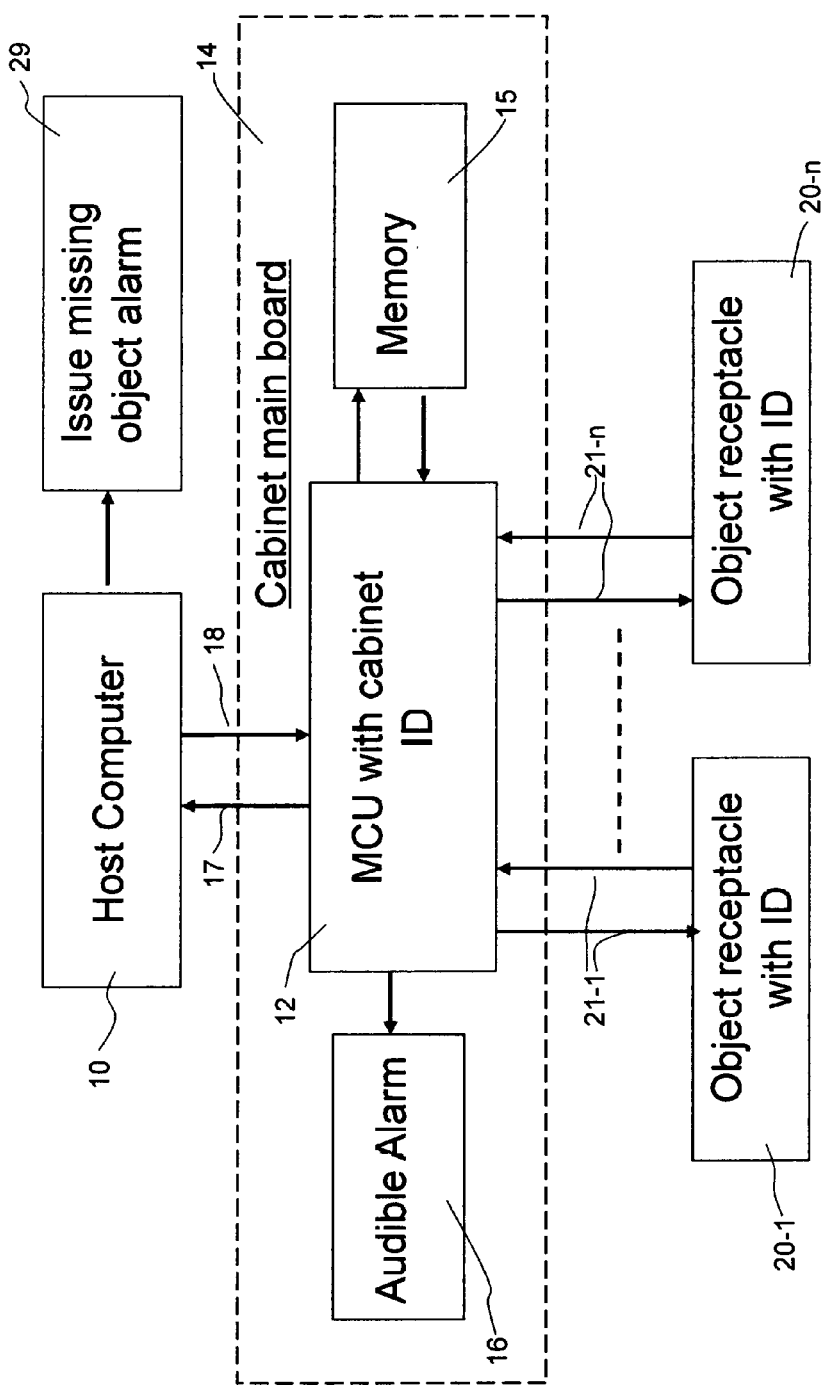
FIG. 1 is a schematic block diagram of a collective objects management system incorporating the invention.

The invention has wide application to a large variety of collective object management systems. Turning now to the drawings, FIG. 1 is schematic block diagram of a collective objects management system incorporating the enhanced security features of the invention. As seen in this Fig., a host computer 10 is coupled to a cabinet MCU 12 carried by a cabinet main board 14. Cabinet main board 14 also contains a memory unit 15 and an audible alarm unit 16. Cabinet MCU 12 is preferably a type LPC1766 unit made by NXP Semiconductors, Eindhoven, The Netherlands and contains cabinet identification information serving to uniquely identify the cabinet in which the cabinet MCU 12 is located. Memory unit 15 is preferably a type AT24c02 unit made by Atmel Corporation, San Jose, Calif., USA. and serves to store a local inventory of objects located in the associated cabinet. Audible alarm unit 16 is preferably a type LEB1295-05B-2.3-7.6-R unit made by Changzhou Wujin Lianhua Electronics Co., Ltd, China and capable of generating audible alarm signals of two different discernible types-such as a short "beep" and a long "beep". Host computer 10 is coupled to cabinet MCU by a bidirectional communication link—signified by the two oppositely directed arrows 17, 18. The bidirectional communication link may be a hard-wired link or a wireless link, as desired in any given application. While FIG. 1 depicts only one cabinet main board 14, it is understood that a plurality of cabinet main boards each located in a different associated cabinet is typically coupled to host computer 10 in a configured system.

Cabinet MCU 12 is coupled to a plurality of object receptacle units 20-1, . . . , 20-n contained in the associated cabinet by means of bidirectional links signified by oppositely directed arrow pairs 21-1, . . . , 21-n. Each object receptacle unit 20-i includes an MCU with a unique identification character. The MCU is preferably a type LPC1766 unit made by NXP Semiconductors, Eindhoven, The Netherlands. The object receptacle units 20-I may be contained in file folders of the type disclosed in the '717 patent referenced above, binders of the type disclosed in the '143 patent referenced above, object carriers of the type disclosed in the '010 patent application referenced above, or the equivalent.

Cabinet MCU 12 is configured to periodically poll all object receptacle units 20-i located in the cabinet. The period between successive polling operations is preferably relatively short, such as two seconds, in order to detect any changes in a timely fashion. In response, each object receptacle unit supplies its unique identification character to cabinet MCU 12. Cabinet MCU 12 compares the received responses with a collection of unique identification characters previously stored in memory unit 15 during the previous polling operation and updates the contents of memory unit 15 if any changes have occurred since the last polling operation. Changes which can be detected by cabinet MCU 12 are a new object receptacle installed in the cabinet since the previous polling operation, a missing object receptacle which was previously located in the cabinet, and an object receptacle which was checked out as authorized by the host computer 10. All changes are communicated from cabinet MCU 12 to host computer 10, which then updates its master list of objects and locations. This polling technique is described more fully in commonly assigned, co-pending U.S. patent application Ser. No. 14/756,580 filed Sep. 18, 2915 for "Collective Objects Management System With Improved Object Data Base Management", the disclosure of which is hereby incorporated by reference.

To search for a given object, an identification of a sought object is first entered into host computer 10 by an operator. Host computer 10 communicates the system identification of the sought object to all cabinet MCUs 12. Each cabinet MCU 12 communicates the system identification of the sought object to each object receptacle in the associated cabinet and waits for a response. If there is a match between the system identification of the sought object and an object receptacle in the cabinet, the corresponding object receptacle generates an object found signal which is received by the cabinet MCU 12. Upon receipt of the object found signal, cabinet MCU 12 communicates this successful result to the host computer 10. If there is no response from any of the cabinet MCUs 12, the host computer enters an indication that the sought object is missing from the system.

The enhanced security afforded by the invention resides in two separate features: a local alarm function and a remote alarm function. The local alarm feature functions in the following manner. After cabinet MCU 12 has completed a polling operation (a scan in FIG. 2—flow block 22), compared the results with the information stored in memory 15 and determined that an object is currently missing, a check is conducted by cabinet MCU 12 to determine whether a search signal for the missing object had previously been received from host computer 10. If so, cabinet MCU 12 simply reports this event to host computer 10 (flow blocks 24, 34). If not, the result signifies that an object has recently (within the period between successive polling operations— e.g., two seconds) been removed in an unauthorized manner from the cabinet (flow block 25). Cabinet MCU then generates a distinctive activation signal ("long beep"—flow block 27) for audible alarm unit 16. Any authorized personnel in the audible range of audible alarm unit 16 can then take immediate action to investigate the circumstances of the unauthorized removal of the object. In addition, cabinet MCU 12 reports this event to host computer 10 (flow block 35), which can take additional, remote action (block 29, FIG. 1), such as automatically notifying a supervisor, automatically dialing the police authorities, automatically locking the doors to the cabinet storage facility, or any other appropriate action.

Figure 2:
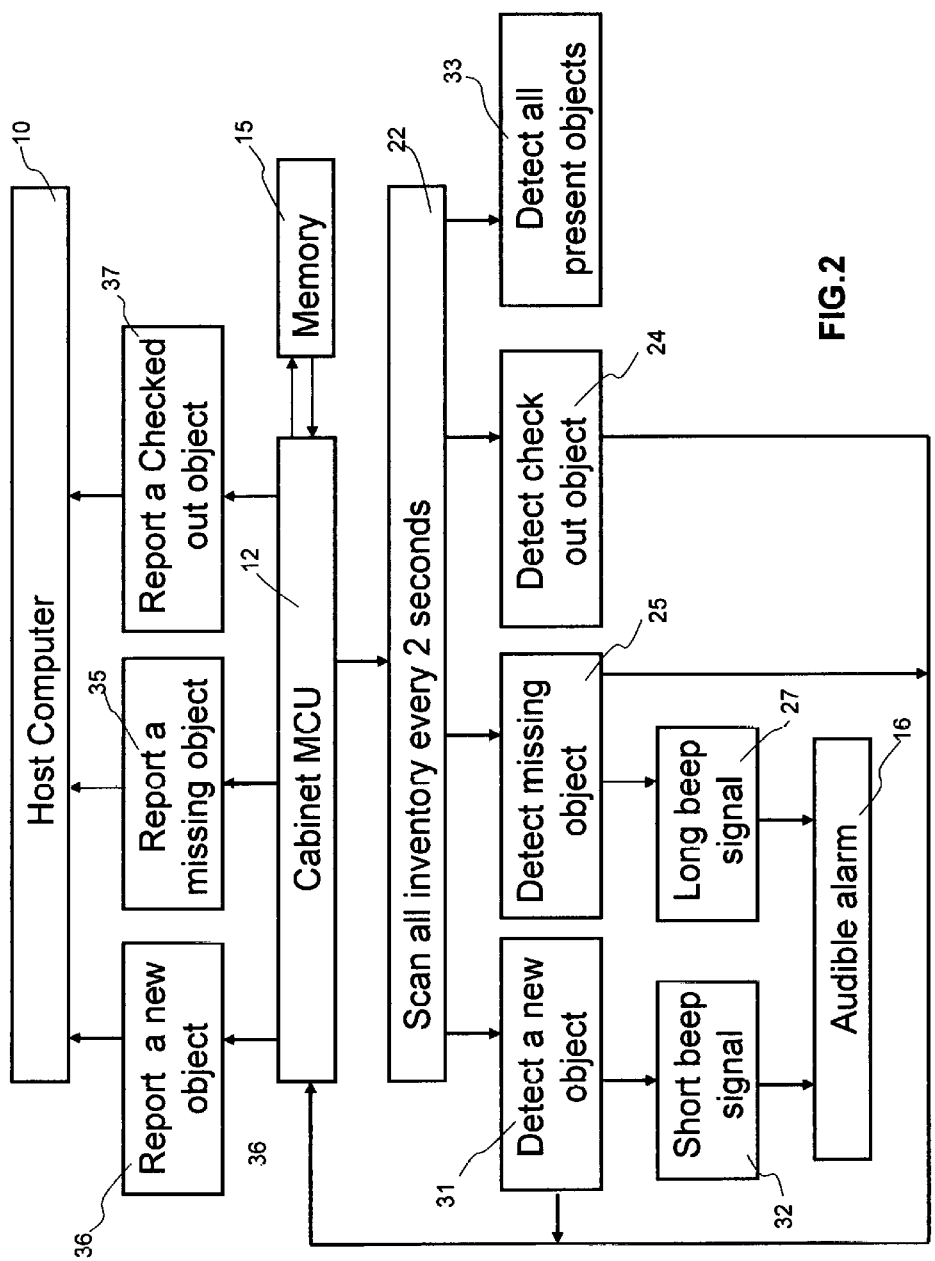
FIG. 2 is a compound partial block and flow diagram illustrating the enhanced security operation of the system of FIG. 1.

The system of FIGS. 1 and 2 also functions to provide an audible confirmation to a user that a new object receptacle has been successfully operationally installed (block 31—FIG. 2) by generating a second distinctive activation signal ("short beep"—flow block 32—FIG. 2). The successful installation of a new object receptacle is reported to host computer 10 (flow block 36). The function indicated by flow block 33 is simply the result of the polling operation.

As will now be apparent, collective objects management systems incorporating the invention provide enhanced security for such systems without adding substantial cost to the system components. By providing the local security feature of an audible alarm unit in each cabinet activatable by the local cabinet MCU when the removal of an object is unauthorized, authorized personnel in the range of the audible alarm unit are enabled to take immediate action to investigate and intervene, if necessary, to prevent the possible theft or unauthorized re-location of an object registered in the system. Also, by providing the remote security feature of the invention, additional steps can be taken to prevent or deter a theft or unauthorized re-location of an object registered in the system.

Although the above provides a full and complete disclosure of the preferred embodiments of the invention, various modifications, alternate constructions and equivalents will occur to those skilled in the art. For example, while the invention has been described with reference to specific microcontroller devices, other comparable devices may be employed, depending on the preferences of the system designer. In addition, while the specific circuitry has been described with reference to a single file cabinet, it is understood that the invention may be implemented using multiple file cabinets positioned at the same or different locations in an office. Further, the invention may be used to provide enhanced security for a collective objects management system of many cabinets positioned at different physical locations using an internal or an external computer network, if desired. Therefore, the above should not be construed as limiting the invention, which is defined by the appended claims.

What is claimed is:

1. A cabinet microcontroller unit having at least one input/output terminal for communication with a host computer, a memory unit coupled to said cabinet microcontroller, a plurality of object receptacles each coupled to said cabinet microcontroller and each having an object receptacle microcontroller for storing unique identification information for an associated object, and an audible indicator coupled to said cabinet microcontroller, said cabinet microcontroller being configured to perform a polling operation on all said object receptacles coupled thereto, to compare the unique identification information received from said object receptacles during a current polling operation with information stored in said memory during a previous polling operation, to detect a missing object receptacle, and to activate said audible indicator with a first distinct audible signal when said missing object receptacle is unauthorized; and wherein said cabinet microcontroller is further configured to detect a new object receptacle and to activate said audible indicator with a second distinct audible signal to signify that said new object receptacle is operationally installed.

2. A collective objects management system having a host computer and a plurality of cabinet microcontroller units each having at least one input/output terminal for communication with said host computer, a memory unit coupled to said cabinet microcontroller, a plurality of object receptacles each coupled to said cabinet microcontroller and each having an object receptacle microcontroller for storing unique identification information for an associated object, and an audible indicator coupled to said cabinet microcontroller, said cabinet microcontroller being configured to perform a polling operation on all said object receptacles coupled thereto, to compare the unique identification information received from said object receptacles during a current polling operation with information stored in said memory during a previous polling operation, to detect a missing object receptacle, and to activate said audible indicator with a first distinct audible signal when said missing object receptacle is unauthorized; and wherein each said cabinet microcontroller is further configured to detect a new object receptacle and to activate said audible indicator with a second distinct audible signal to signify that said new object receptacle is operationally installed.

3. The system of claim 2 wherein said cabinet microcontroller is also configured to notify said host computer when said missing object receptacle is unauthorized so that said host computer can take further remote action to prevent unauthorized re-location of said missing object receptacle.

* * * * *

UNITED STATES PATENT AND TRADEMARK OFFICE
CERTIFICATE OF CORRECTION

PATENT NO. : 9,792,790 B1
APPLICATION NO. : 14/999871
DATED : October 17, 2017
INVENTOR(S) : Zhu et al.

It is certified that error appears in the above-identified patent and that said Letters Patent is hereby corrected as shown below:

On the Title Page

Item (73) Assignee:
Change "MICRODATA CORPORATION" to --iMicrodata Corporation--

Signed and Sealed this
Fifth Day of December, 2017

Joseph Matal
*Performing the Functions and Duties of the
Under Secretary of Commerce for Intellectual Property and
Director of the United States Patent and Trademark Office*